United States Patent
Dal Prà et al.

(10) Patent No.: US 9,067,639 B2
(45) Date of Patent: Jun. 30, 2015

(54) BOTTOM BRACKET ASSEMBLY OF A BICYCLE AND LEFT CRANK ARM ASSEMBLY THEREOF

(71) Applicant: Campagnolo S.r.l., Vicenza (IT)

(72) Inventors: Giuseppe Dal Prà, Zané (IT); Nicola Sgreva, Arcugnano (IT)

(73) Assignee: Campagnolo S.r.l., Vicenza (IT)

(*) Notice: Subject to any disclaimer, the term of this patent is extended or adjusted under 35 U.S.C. 154(b) by 0 days.

(21) Appl. No.: 14/139,236

(22) Filed: Dec. 23, 2013

(65) Prior Publication Data

US 2014/0109722 A1  Apr. 24, 2014

Related U.S. Application Data

(63) Continuation of application No. 13/743,098, filed on Jan. 16, 2013.

(30) Foreign Application Priority Data

Jan. 16, 2012 (EP) ..................................... 12000207

(51) Int. Cl.
*B62M 1/36* (2013.01)
*B62M 3/00* (2006.01)
*B62K 3/02* (2006.01)

(52) U.S. Cl.
CPC ............. *B62M 3/003* (2013.01); *Y10T 74/2164* (2015.01); *B62K 3/02* (2013.01)

(58) Field of Classification Search
CPC .................................... B62K 3/02; B62K 3/14
USPC .................................. 280/258, 256, 260, 259
See application file for complete search history.

(56) References Cited

U.S. PATENT DOCUMENTS 6,899,402 B2  5/2005  Chiang

FOREIGN PATENT DOCUMENTS

| EP | 1342656 A2 | 9/2003 |
| EP | 1736403 A1 | 12/2006 |
| EP | 1792819 A1 | 6/2007 |
| EP | 1792820 A1 | 6/2007 |
| EP | 1852343 A2 | 11/2007 |
| EP | 2067693 A2 | 6/2009 |
| EP | 2110301 A1 | 10/2009 |
| EP | 2246248 A1 | 11/2010 |
| FR | 1252564 A | 1/1961 |

OTHER PUBLICATIONS

European Search Report for Application No. 12000207.6, dated Jun. 28, 2012.

*Primary Examiner* — Kevin Hurley
*Assistant Examiner* — Marlon Arce
(74) *Attorney, Agent, or Firm* — Volpe and Koenig, P.C.

(57) ABSTRACT

A bicycle bottom bracket assembly that reduces the accumulation of dirt and/or corrosive substances inside the shaft extending between the crank arms of the assembly. The bottom bracket assembly includes a shaft having a through-cavity that extends along its longitudinal direction; a crank arm is associated with each end portion of the shaft, and the through-cavity extends unobstructed through the crank arms and the shaft.

19 Claims, 4 Drawing Sheets

BOTTOM BRACKET ASSEMBLY OF A BICYCLE AND LEFT CRANK ARM ASSEMBLY THEREOF

CROSS REFERENCE TO RELATED APPLICATIONS

This application is a continuation of U.S. patent application Ser. No. 13/743,098, filed Jan. 16, 2013, which claims the benefit of European Patent Application 12000207.6, filed Jan. 16, 2012, all of which are incorporated by reference as if fully set forth.

FIELD OF INVENTION

The present invention generally relates to a bicycle bottom bracket assembly. More particularly, the present invention relates to the bottom bracket of a racing bicycle, and a left crank arm assembly for such a bottom bracket assembly.

BACKGROUND

As known, a bottom bracket assembly of a bicycle comprises a shaft and two crank arms (right and left) associated with the opposite end portions of the shaft. The shaft can be made as a separate piece from the two crank arms or it can be made integral with one of the two crank arms. If desired, the shaft can be made in two or more pieces (shaft elements) which are connected together and each shaft element may formed in one piece with a respective crank arm.

The shaft of the bottom bracket assembly is mounted in a housing box suitably provided in the frame of the bicycle. The rotation of the shaft with respect to the bicycle frame is achieved by fitting a pair of rolling bearings on the shaft. In particular, each bearing is typically mounted on the shaft at a respective end portion of the shaft, in a position adjacent to a respective crank arm. When the bottom bracket assembly is mounted on the bicycle frame, each bearing is operatively arranged between the shaft and the housing box provided in the bicycle frame.

Bottom bracket assemblies with hollow shafts, which satisfy the ongoing need of manufacturers of bicycle components, particularly of racing bicycles, to reduce the overall weight of the bicycle are know.

For example, European patent EP 1792820 to the same assignee of the present application describes a bottom bracket assembly comprising a hollow shaft to which the right and left crank arms are coupled in rotation through respective front toothings, the crank arms being axially fixed to the shaft through respective screws arranged in a radially inner position with respect to the shaft.

European patent application EP 2067693 to the same assignee of the present application describes bottom bracket assemblies comprising hollow shafts to which the right and left crank arms are axially fixed through respective screws arranged in a radially inner position with respect to the shaft or the shaft elements. In an embodiment, moreover, two hollow shaft elements are frontally associated through a screw, again arranged in a radially inner position with respect to the two shaft elements.

The mounting of the bottom bracket assemblies, like those described above, in the housing box of the bicycle frame takes place by associating one of the two crank arms with an end of the shaft and then inserting the shaft in the housing box. Such a crank arm is substantially used as a reference for the correct positioning of the other crank arm, which is then associated with the other end of the shaft through a screw arranged in a radially inner position with respect to the shaft.

It has been found that the screws used to fix the crank arms to the shaft or to fix together the two shaft elements create possible obstructions inside the shaft on which dirt and/or corrosive substances can collect and damage the screws and/or the shaft itself.

SUMMARY

The present invention provides a bicycle bottom bracket assembly that reduces the accumulation of dirt and/or corrosive substances inside the shaft. The bottom bracket assembly includes a shaft having an longitudinal axis extending along a longitudinal direction; a crank arm is associated with the end portions of the shaft, and a through-cavity, that extends along the longitudinal axis and passes unobstructed through the crank arms and the shaft.

BRIEF DESCRIPTION OF THE DRAWINGS

The details and advantages of the present invention will become clearer from the following detailed description of a preferred embodiments made with reference to the attached drawings wherein.

DETAILED DESCRIPTION OF THE PREFERRED EMBODIMENTS

Introduction

Figure 1:
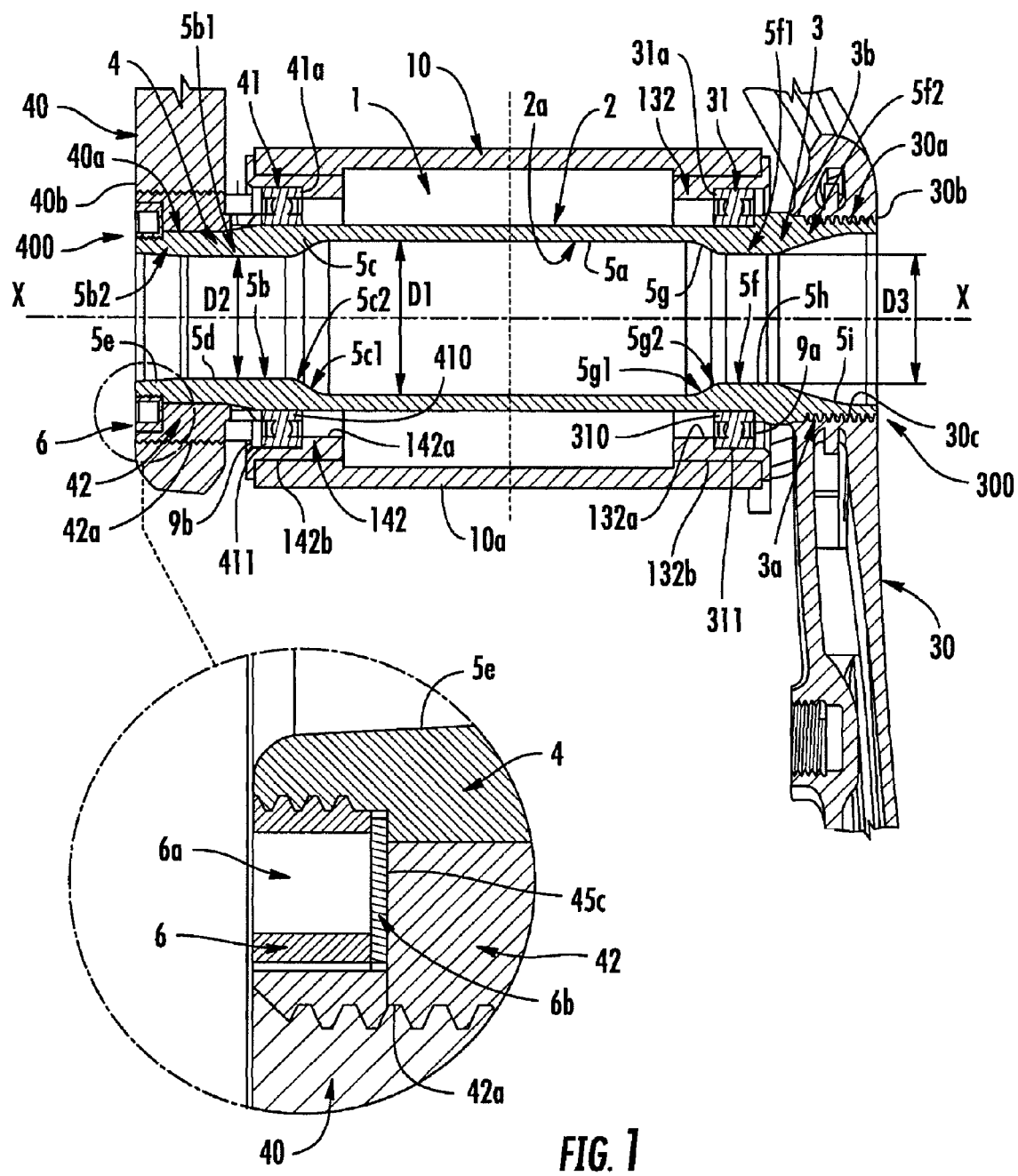
FIG. 1 schematically shows a longitudinal section view of a bottom bracket assembly of a bicycle according to the present invention, with a detail thereof in enlarged scale, such a detail being defined by a dotted and dashed circumference.

In a first aspect, the present invention therefore relates to a bicycle bottom bracket assembly having a shaft having an axis with a through-cavity that passes without any obstructions through the shaft and through the left and right crank arms. For the sake of simplicity of explanation, throughout the following description and in the subsequent claims, reference will be made, unless expressly indicated otherwise, to a shaft made in a single piece. However it is understood that what is described is also valid in the case in which the shaft is made of multiple shaft elements. Moreover, throughout the present description and in the subsequent claims, the component of the bicycle bottom bracket assembly comprising the shaft (or a shaft element) and the left crank arm associated with one another, is identified with the expression "left crank arm assembly."

Throughout the present description and in the subsequent claims, the expression "through-cavity" refers to one or more components (such as the left crank arm and/or the right crank arm and/or the shaft of a bottom bracket assembly of a bicycle) and indicates a cavity that is open at the opposite ends thereof and the interior surface that defines the through-cavity is without any sharp or sudden variation in diameter. In other words, the interior surface that defines the aforementioned through-cavity, at every variation in diameter, has a radiused portion without sharp edges or undercut areas.

The left and right crank arms have respective outer faces (i.e. faces facing opposite ways with respect to the shaft or, in use, to the frame of the bicycle) and the through-cavity extends without interruption or obstructions from the outer face of one crank arm to the outer face of the other crank arm (i.e. from the left outer face of the left crank arm up to the right outer face of the right crank arm), so that the through-cavity has a longitudinal extension that is substantially equal to that of the bottom bracket assembly.

Advantageously, the provision of such a through-cavity makes it possible to reduce the dirt and/or corrosive substances deposited inside the shaft. Indeed, the dirt and/or the corrosive substances entering into the cavity of the shaft from an end thereof can easily come out—thanks also to the high rotation speed of the shaft during use—from the opposite end to that from which they entered, as well as possibly from the same end from which they entered. Moreover, the provision of a through-cavity allows easy cleaning thereof.

Preferably, the bottom bracket assembly according to the invention comprises a first coupler for coupling the left crank arm with the shaft that is arranged in a radially outer position with respect to the through-cavity. More preferably, the first coupler is arranged in a radially outer position with respect to the shaft. In this way, there are no obstacles to stop the dirt and/or corrosive substances that may have entered inside the shaft from coming out.

Preferably, the bottom bracket assembly according to the invention comprises a second coupler for coupling the right crank arm with the shaft; the second coupling being arranged in a radially outer position with respect to the through-cavity. More preferably, the second coupling is arranged, like the first coupling, in a radially outer position with respect to the shaft so there are no obstacles to stop the dirt and/or corrosive substances that may have entered inside the shaft from coming out.

Preferably, the through-cavity comprises a substantially cylindrical central portion having a first diameter and a first axial end portion having at least one second diameter different from the aforementioned first diameter.

More preferably, the aforementioned first axial end portion is connected to the aforementioned substantially cylindrical central portion through a first radiused surface. Throughout the present description and in the subsequent claims, the expression "radiused surface" is used to indicate a curved surface, without sharp edges or undercut portions.

In this way, it is made even easier for dirt and/or corrosive substances that may have entered into the through-cavity to come out by the fact that the dirt and/or corrosive substances are not hampered inside the shaft during movement toward the ends of the through-cavity.

Preferably, the aforementioned first axial end portion comprises, in a proximal position to the aforementioned substantially cylindrical central portion, at least a plurality of first transversal sections having smaller diameters than the aforementioned first diameter.

More preferably, the aforementioned first transversal sections define a cylindrical surface.

Even more preferably, the aforementioned first axial end portion comprises, in a distal position with respect to the aforementioned substantially cylindrical central portion, a plurality of second transversal sections having progressively increasing diameters moving away from the aforementioned substantially cylindrical central portion.

In this way, the second transversal sections define a substantially conical-shaped surface, for which reason it is particularly easier for dirt and/or corrosive substances that may have entered into the through-cavity to come out.

Preferably, the shaft of the bottom bracket assembly according to the invention is made of metallic material, more preferably light alloy, for example aluminium alloy.

Preferably, the substantially cylindrical central portion of the bottom bracket assembly according to the invention has a diameter equal to about 25 mm.

Preferably, the shaft of the bottom bracket assembly according to the invention, at the aforementioned substantially cylindrical central portion, has an outer diameter equal to about 30 mm.

Preferably, the first transversal sections of the bottom bracket assembly according to the invention have a diameter equal to about 20 mm.

Preferably, the second transversal sections of the bottom bracket assembly according to the invention define a conical surface, more preferably a conical surface with a rectilinear generatrix.

Preferably, said rectilinear generatrix is inclined with respect to the axis of the bottom bracket assembly according to the invention by an angle comprised between about 5° and about 7°, more preferably equal to about 6.7°.

Preferably, the second transversal sections of the bottom bracket assembly according to the invention comprise an axially outermost transversal section having a diameter greater than about 20 mm, more preferably equal to about 20.8 mm.

Preferably, the first radiused surface of the bottom bracket assembly according to the invention comprises a concave surface and a convex surface.

Throughout the present description and in the subsequent claims, the expression "concave surface" is used to indicate a curved surface the concavity of which faces towards the axis of the bottom bracket assembly. Vice versa, the expression "convex surface" is used to indicate a curved surface the concavity of which faces the opposite way with respect to the axis of the bottom bracket assembly.

Preferably, the concave surface of the aforementioned first radiused surface has a bending radius greater than that of the aforementioned convex surface. More preferably, the bending radius of the aforementioned concave surface is equal to about 7 mm and the bending radius of the aforementioned convex surface is equal to about 5 mm.

Preferably, the through-cavity of the bottom bracket assembly according to the invention comprises, on the opposite side to said first axial end portion with respect to said substantially cylindrical central portion, a second axial end portion having at least a third diameter different from said first diameter.

Preferably, the second axial end portion of the bottom bracket assembly according to the invention is connected to said substantially cylindrical central portion through a second radiused surface.

Preferably, the second axial end portion of the bottom bracket assembly according to the invention comprises, in a position proximal to said substantially cylindrical central portion, a plurality of third transversal sections having smaller diameters than said first diameter.

Preferably, the aforementioned third transversal sections define a cylindrical surface.

Preferably, the second axial end portion of the bottom bracket assembly according to the invention comprises, in a distal position with respect to said substantially cylindrical central portion, a plurality of fourth transversal sections having progressively increasing diameters moving away from said substantially cylindrical central portion.

Preferably, the third transversal sections of the bottom bracket assembly according to the invention have a diameter greater than about 20 mm, more preferably equal to about 21 mm.

Preferably, the fourth transversal sections of the bottom bracket assembly according to the invention comprise an axially outermost transversal section having a diameter greater than about 25 mm, more preferably equal to about 28 mm.

Preferably, the second radiused surface of the bottom bracket assembly according to the invention comprises a concave surface and a convex surface.

Preferably, the concave surface of the aforementioned second radiused surface has a greater bending radius than that of the aforementioned convex surface. More preferably, the bending radius of the aforementioned concave surface is equal to about 7 mm, whereas the bending radius of the aforementioned convex surface is equal to about 5 mm.

Preferably, the first axial end portion of the bottom bracket assembly according to the invention is defined at the aforementioned left crank arm.

Preferably, the left crank arm is made of composite material, more preferably carbon fibre. Alternatively, the left crank arm can be made of metal material, more preferably light alloy, for example aluminium alloy.

Preferably, when the aforementioned left crank arm is made of composite material, the body of composite material of the left crank arm is coupled (preferably screwed) with the radially outer surface of a substantially annular metallic insert, such a metallic insert being in turn coupled with the first axial end portion of the shaft. In this case, the left crank arm discussed throughout this description and in the claims is the assembly formed by the aforementioned body of composite material and the aforementioned metallic insert.

Preferably, the second axial end portion of the bottom bracket assembly according to the invention is defined at the right crank arm of the bottom bracket assembly.

Preferably, the aforementioned right crank arm is made of metal material, more preferably light alloy, for example aluminium alloy.

Preferably, the first end portion of the shaft of the bottom bracket assembly according to the invention comprises a grooved outer surface and the left crank arm comprises a through hole which is at least partially grooved for the sliding coupling with the aforementioned grooved outer surface.

Preferably, the first end portion of the shaft of the bottom bracket assembly according to the invention comprises, in an axially outermost position with respect to the aforementioned grooved outer surface, an external threading, the bottom bracket assembly further comprising an internally threaded ring nut screwed onto the aforementioned external threading and in axial abutment on the aforementioned left crank arm.

Preferably, the aforementioned ring nut is housed in a substantially circumferential seat formed in the left crank arm, so that the ring nut does not project axially with respect to the left crank arm itself.

Preferably, the aforementioned ring nut comprises, on an axially outer face thereof, at least one hole for coupling with a mounting tool. Preferably, there are four circumferentially equally spaced holes.

Preferably, the second end portion of the shaft of the bottom bracket assembly according to the invention comprises a threaded outer surface and the right crank arm comprises a threaded hole for screwing onto said threaded outer surface.

Preferably, the bottom bracket assembly according to the invention further comprises:

a pair of bearings adapted to support the aforementioned shaft in rotation and an adjuster for adjusting the axial position of at least one of the left crank arm and the right crank arm with respect to the aforementioned pair of bearings;

wherein said adjuster is axially arranged between said at least one of the left crank arm and the right crank arm and a respective bearing of the aforementioned pair of bearings.

Preferably, the aforementioned adjuster comprises:

a first service ring nut in axial abutment with the aforementioned bearing of the aforementioned pair of bearings;

a second service ring nut coupled with the first service ring nut and in axial abutment with said at least one of the left crank arm and the right crank arm; and, a position lock for fixing the axial position of the second service ring nut with respect to the first service ring nut.

Preferably, the first service ring nut comprises:

an external threading, the second service ring nut comprises an internal threading engaged with the aforementioned external threading and the aforementioned position lock comprises a fixing dowel acting on the first service ring nut and passing through a substantially radial hole formed on the second service ring nut. Preferably, the fixing dowel is externally threaded and engages on a threading of the aforementioned substantially radial hole.

In a second aspect thereof, the present invention relates to a left crank arm assembly of a bicycle comprising:

a shaft having an axis extending along a longitudinal direction;

a left crank arm associated with a first end portion of said shaft;

wherein said left crank arm is axially blocked with respect to said first end portion of said shaft by a ring nut acting in abutment on said left crank arm and screwed onto an external threading formed on said first end portion of said shaft.

Preferably, such a left crank arm assembly of a bicycle comprises, individually or in combination, the structural and functional characteristics of the shaft and of the left crank arm discussed above with reference to the bottom bracket assembly of a bicycle according to the first aspect of the present invention and, therefore, it has all of the aforementioned advantages.

In a third aspect thereof, the present invention relates to a bottom bracket assembly of a bicycle, comprising:

a shaft having an axis extending along a longitudinal direction;

a pair of crank arms, each one associated with a respective end portion of said shaft;

a pair of bearings adapted to support said shaft in rotation with respect to a housing box of the bottom bracket assembly provided in a bicycle frame;

an adjuster for adjusting the axial position of at least one crank arm of said pair of crank arms with respect to said pair of bearings, wherein said adjustment means are axially arranged between said at least one crank arm and a respective bearing of said pair of bearings, wherein said adjuster comprises:

a first service ring nut in axial abutment with said respective bearing;

a second service ring nut coupled with said first service ring nut and in axial abutment with said at least one crank arm; and, a position lock for fixing the axial position of said second service ring nut with respect to said first service ring nut.

Advantageously, the aforementioned adjuster allows a fine adjustment of the axial position of the crank arms with respect to the bearings and, consequently, to the housing box of the bottom bracket assembly provided in the frame of the bicycle.

In this way, it is possible to achieve the desired axial position of the crank arms with respect to the housing box even when housing boxes (and possible adapter elements) of axial dimensions different from standard are used. It is thus possible to effectively compensate possible variations from the design dimensions and/or dimensional tolerances on the housing boxes (and on the possible adapter elements). Since narrow dimensional tolerances are not required, the housing boxes (and the possible adapter elements) can consequently be obtained with less costly processing.

Preferably, the first service ring nut comprises an external threading, the second service ring nut comprises an internal threading engaged with the aforementioned external threading and the aforementioned position lock comprises a fixing dowel acting on the first service ring nut and passing through a substantially radial hole formed on the second service ring nut. Preferably, the fixing dowel is externally threaded and engages on a threading of the substantially radial hole.

Preferably, the bottom bracket assembly of a bicycle according to the aforementioned third aspect comprises, individually or in combination, the structural and functional characteristics discussed above with reference to the bottom bracket assembly of a bicycle according to the first aspect of the invention and, therefore, it has substantially all of the aforementioned advantages.

Hereafter, when mention is made of the bottom bracket assembly of a bicycle, it is intended to explicit refer to the bottom bracket assembly according to the aforementioned third aspect.

In particular, the bottom bracket assembly of a bicycle preferably comprises a through-cavity extending along said longitudinal direction and entirely passing without any obstructions through said pair of crank arms and said shaft.

The bottom bracket assembly preferably comprises first coupler for coupling the left crank arm with said shaft, said first coupling means being arranged in a radially outer position with respect to said through-cavity.

More preferably, the first coupler is arranged in a radially outer position with respect to said shaft.

Preferably, the bottom bracket assembly comprises second coupler for coupling the right crank arm with said shaft, said second coupling means being arranged in a radially outer position with respect to said through-cavity.

More preferably, the second coupler is arranged in a radially outer position with respect to said shaft.

Preferably, the through-cavity of the bottom bracket assembly comprises a substantially cylindrical central portion having a first diameter and a first axial end portion having at least one second diameter different from said first diameter.

More preferably, said first axial end portion is connected to said substantially cylindrical central portion through a first radiused surface.

Preferably, said first axial end portion comprises, in a proximal position to said substantially cylindrical central portion, at least a plurality of first transversal sections having smaller diameters than said first diameter.

More preferably, said first transversal sections define a cylindrical surface.

Even more preferably, the bottom bracket assembly comprises, in a distal position with respect to said substantially cylindrical central portion, a plurality of second transversal sections having progressively increasing diameters moving away from said substantially cylindrical central portion.

In this way, the second transversal sections define a substantially conical-shaped surface.

Preferably, the shaft of the bottom bracket assembly is made of metal material, more preferably light alloy, for example aluminium alloy.

Preferably, the substantially cylindrical central portion of the bottom bracket assembly has a diameter equal to about 25 mm.

Preferably, the shaft of the bottom bracket assembly, at said substantially cylindrical central portion, has an outer diameter equal to about 30 mm.

Preferably, the first transversal sections of the bottom bracket assembly have a diameter equal to about 20 mm.

Preferably, the second transversal sections of the bottom bracket assembly define a conical surface, more preferably a conical surface with rectilinear generatrix.

Preferably, said rectilinear generatrix is inclined with respect to the axis of the bottom bracket assembly by an angle comprised between about 5° and about 7°, more preferably equal to about 6.7°.

Preferably, the second transversal sections of the bottom bracket assembly comprise an axially outermost transversal section having a diameter greater than about 20 mm, more preferably equal to about 20.8 mm.

Preferably, the first radiused surface of the bottom bracket assembly comprises a concave surface and a convex surface.

Preferably, the concave surface of the aforementioned first radiused surface has a greater bending radius than that of the aforementioned convex surface. More preferably, the bending radius of the aforementioned concave surface is equal to about 7 mm and the bending radius of the aforementioned convex surface is equal to about 5 mm.

Preferably, the through-cavity of the bottom bracket assembly comprises, on the opposite side to said first axial end portion with respect to said substantially cylindrical central portion, a second axial end portion having at least a third diameter different from said first diameter.

Preferably, the second axial end portion of the bottom bracket assembly is connected to said substantially cylindrical central portion through a second radiused surface.

Preferably, the second axial end portion of the bottom bracket assembly comprises, in a proximal position to said substantially cylindrical central portion, a plurality of third transversal sections having smaller diameters than said first diameter.

Preferably, the aforementioned third transversal sections define a cylindrical surface.

Preferably, the second axial end portion of the bottom bracket assembly comprises, in a distal position with respect to said substantially cylindrical central portion, a plurality of fourth transversal sections having progressively increasing diameters moving away from said substantially cylindrical central portion.

Preferably, the third transversal sections of the bottom bracket assembly have a diameter greater than about 20 mm, more preferably equal to about 21 mm.

Preferably, the fourth transversal sections of the bottom bracket assembly comprise an axially outermost transversal section having a diameter greater than about 25 mm, more preferably equal to about 28 mm.

Preferably, the second radiused surface of the bottom bracket assembly comprises a concave surface and a convex surface.

Preferably, the aforementioned concave surface has a bending radius greater than that of the aforementioned convex surface. More preferably, the bending radius of the aforementioned concave surface is equal to about 7 mm, whereas the bending radius of the aforementioned convex surface is equal to about 5 mm.

Preferably, the first axial end portion of the bottom bracket assembly is defined at the left crank arm.

Preferably, the left crank arm is made of composite material, more preferably carbon fibre. Alternatively, the left crank arm can be made of metal material, more preferably light alloy, for example aluminium alloy.

Preferably, when the left crank arm is made of composite material, the body of composite material of the left crank arm is coupled (preferably screwed) with the radially outer surface of a substantially annular shaped metal insert, such a metal insert being in turn adapted to be coupled with the first axial end portion of the shaft.

Preferably, the second axial end portion of the bottom bracket assembly is defined at the right crank arm.

Preferably, the aforementioned right crank arm is made of metal material, more preferably light alloy, for example aluminium alloy.

Preferably, the first end portion of the shaft of the bottom bracket assembly comprises a grooved outer surface and the left crank arm comprises a through hole which is at least partially grooved for the sliding coupling with the aforementioned grooved outer surface.

Preferably, the first end portion of the shaft of the bottom bracket assembly comprises, in an axially outermost position with respect to the aforementioned grooved outer surface, an external threading, the bottom bracket assembly further comprising an internally threaded ring nut screwed onto the aforementioned external threading and in axial abutment on the left crank arm.

Preferably, the ring nut is housed in a substantially circumferential seat formed in the left crank arm, so that the ring nut does not project axially with respect to the left crank arm itself.

Preferably, the ring nut comprises, on an axially outer face thereof, at least one hole for the coupling of a mounting tool. Preferably, there are four equally circumferentially spaced holes.

Preferably, the second end portion of the shaft comprises a threaded outer surface and the right crank arm comprises a threaded hole for screwing onto said threaded outer surface.

DETAILED DESCRIPTION

With reference to the figures, and in particular FIG. 1, reference numeral 1 indicates a bicycle bottom bracket assembly in accordance with the present invention.

The assembly 1 comprises a shaft 2 having an axis X-X extending along a predetermined longitudinal direction. The shaft 2 comprises opposite end portions 3 and 4, right and left respectively, with which a right crank arm 30 and a left crank arm 40 are respectively associated.

The shaft 2 has a longitudinal through cavity 2a and it is supported in rotation in a housing box 10 suitably provided in the frame of the bicycle through the interposition of a right radial bearing 31 and of a left radial bearing 41. The bearings 31 and 41 are properly mounted on the shaft 2 at the aforementioned end portions 3 and 4 in positions adjacent to the crank arms 30 and 40. In particular, the right radial bearing 31 is in abutment on a shoulder formed on the end portion 3 of the shaft 2.

A protective shield 9a of the right radial bearing 31 is axially arranged between the aforementioned bearing and the shoulder of the end portion 3 of the shaft.

The housing box 10 is defined by a substantially cylinder shaped hollow body 10a having a predetermined axial length and a predetermined internal diameter. The body 10a extends along a longitudinal axis coincides with the axis X-X of the shaft 2 when such a shaft 2 is housed in the housing box 10.

In the embodiment illustrated here, a right adapter element 132 and a left adapter element 142, both substantially annular in shape, are preferably arranged between the bearings 31 and 41 and the housing box 10, respectively.

In particular, the bearings 31 and 41 are respectively inserted in a seat 31a of the right adapter element 132 and in a seat 41a of the left adapter element 142 until they go into abutment, respectively, on a shoulder made at a radially inner surface 132a of the adapter element 132 and on a shoulder made at a radially inner surface 142a of the adapter element 142.

The radially outer surfaces 132b and 142b of the adapter elements 132 and 142 are, on the other hand, associated (for example through forced coupling or threading) with end portions 11 and 12 of the body 10a of the housing box 10.

The middle planes of each bearing 31 and 41, i.e. the planes perpendicular to the axis X-X and passing half-way through each bearing 31 and 41, are spaced apart by a predetermined distance along the axis X-X.

In the assembled configuration thereof, the bearing 31 has an inner ring 310 coupled with the end portion 3 of the shaft 2, and an outer ring 311 coupled with the seat 31a of the right adapter element 132. Similarly, the bearing 41 has an inner ring 410 coupled with the end portion 4 of the shaft 2, and an outer ring 411 coupled with the seat 41a of the left adapter element 142.

Similarly to the shaft 2, the crank arms 30 and 40 also have respective longitudinal through cavities 30a, 40a that, when the assembly 1 of the present invention is in the assembled configuration thereof, are passed through by the end portions 3, 4 of the shaft 2. The cavity 2a of the shaft 2, in the assembly 1 of the present invention, is a through-cavity extending along the predetermined longitudinal direction and through the left crank arm 40, the shaft 2 and the right crank arm 30.

In particular, the left and right crank arms 40, 30 have respective outer faces 40b and 30b and the through-cavity 2a extends without interruption or obstructions from the outer face 40b of the left crank arm 40 up to the outer face 30b of the right crank arm 30. The through-cavity 2a thus has, along the longitudinal direction of the assembly 1, an extension substantially equal to that of the assembly 1.

The bottom bracket assembly 1 comprises a first coupler 400 for coupling the left crank arm 40 with the shaft 2 and second coupler 300 for the right crank arm 30 with the shaft 2. The first coupler 400 and the second coupler 300 are arranged in a radially outer position with respect to the shaft 2, so as not to create obstructions in the through-cavity 5.

Figure 2:
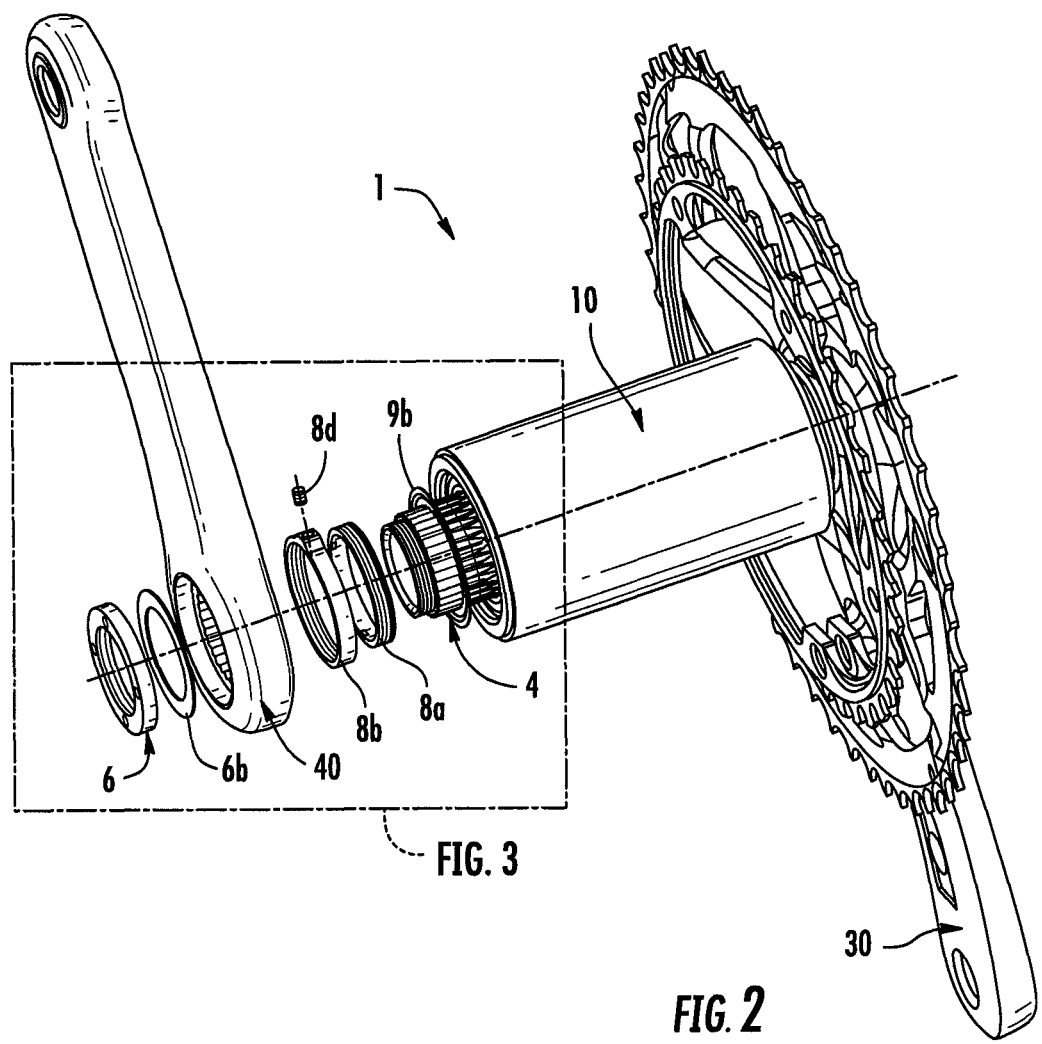
FIG. 2 schematically shows an exploded perspective view of the bottom bracket assembly of a bicycle of FIG. 1 mounted in a housing box of the frame of a bicycle.
Figure 3:
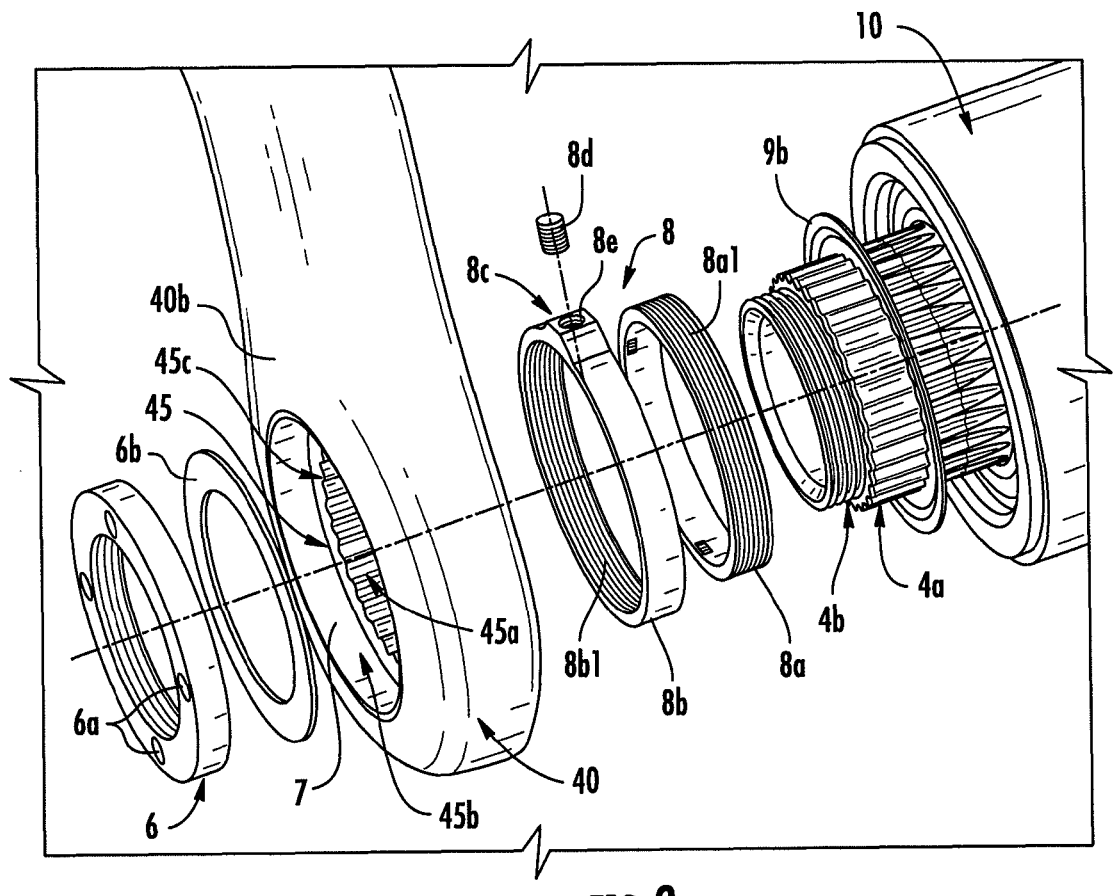
FIG. 3 schematically shows a view in enlarged scale of a detail of the bottom bracket assembly of a bicycle of FIG. 2, such a detail being defined by a dotted and dashed rectangle in FIG. 2.
Figure 4:
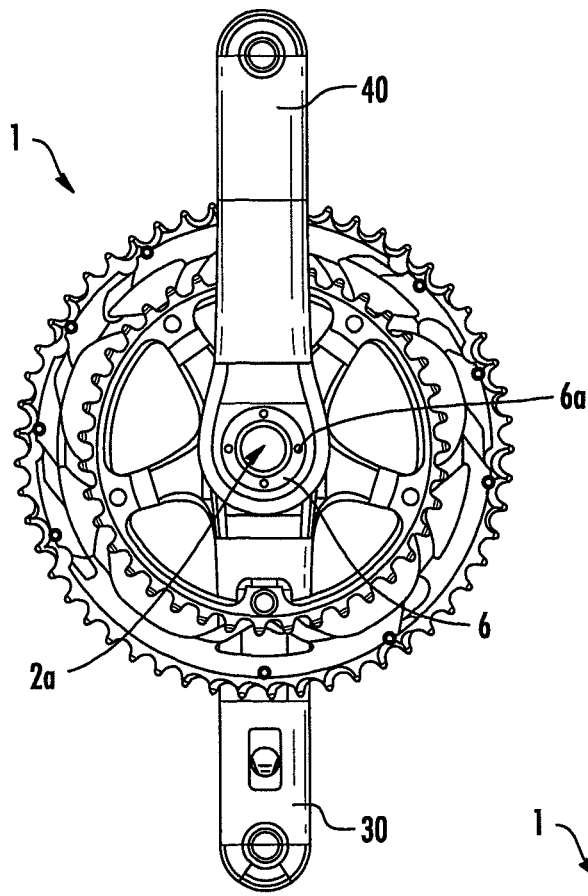
FIG. 4 schematically shows a side view, taken from the side of the left crank arm, of the bottom bracket assembly of a bicycle of FIG. 1; and, FIG. 5 schematically shows a side view, taken from the side of the right crank arm, of the bottom bracket assembly of a bicycle of FIG. 1.
Figure 5:
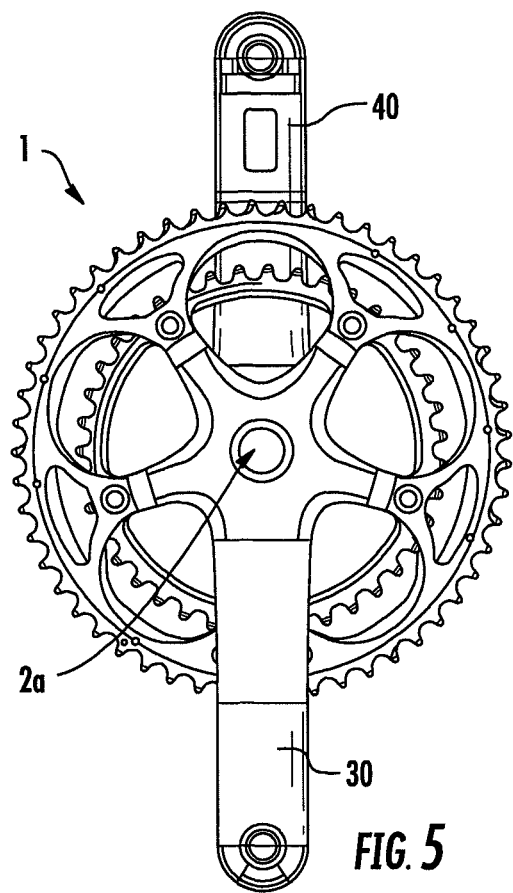

In the specific embodiment illustrated here, the left crank arm 40 is coupled with the first end portion 4 of the shaft 2 through a shape coupling that allows the crank arm 40 to slide with respect to the shaft 2 parallel to the axis X-X. In particular, as shown in FIGS. 2 and 3, the first end portion 4 of the shaft 2 comprises a grooved or slotted outer surface 4a and, in an axially outermost position with respect to outer surface 4a, an external threading 4b. The left crank arm 40 comprises a through hole 45 having, at a longitudinal portion 45a thereof, a grooved or slotted portion that makes a sliding coupling with the outer surface 4a of the shaft 2.

In an axially outermost position with respect to the grooved longitudinal portion 45a, the through hole 45 comprises a non-grooved longitudinal portion 45b. Between the grooved longitudinal portion 45a and the generally smooth longitudinal portion 45b of the through hole 45 a substantially annular abutment surface 45c is defined.

The bottom bracket assembly 1 comprises an internally threaded ring nut 6 which is screwed onto the external threading 4b until it goes into axial abutment on the substantially annular surface 45c of the left crank arm 40, thus axially blocking the left crank arm 40 itself with respect to the first end portion 4 of the shaft 2. A washer 6b is axially arranged between the ring nut 6 and the substantially annular surface 45c of the left crank arm 40.

Preferably, as shown in FIG. 1, the ring nut 6 is housed in a substantially circumferential seat 7 defined in the aforementioned left crank arm 40 at the generally smooth longitudinal portion 45b. The longitudinal extension of the non-grooved longitudinal portion 45b of the through hole 45 is such that the ring nut 6, when housed in the seat 7, does not project axially with respect to the outer face 40b of the left crank arm 40.

As shown in FIGS. 1-4, the ring nut 6 preferably comprises, on an axially outer face thereof, four equally circumferentially spaced holes 6a for coupling with a mounting tool. The second end portion 3 of the shaft 2 comprises a threaded outer surface 3a and the right crank arm 30 comprises a threaded hole 30c for screwing onto the threaded outer surface 3a.

In the specific embodiment illustrated here, the right crank arm 30 is screwed onto the threaded outer until it goes into axial abutment on a shoulder 3b of the second end portion 3. Such a shoulder 3b is provided on an outer surface of the second end portion 3, in an axially innermost position with respect to the threaded outer surface 3a.

The through-cavity 2a of the bottom bracket assembly 1 comprises a substantially cylindrical central portion 5a having a diameter D1 and a first axial end portion 5b having at least one diameter D2 different from the diameter D1.

The first axial end portion 5b is connected to the substantially cylindrical central portion 5a through a first radiused surface 5c comprising a concave surface 5c1 and a convex surface 5c2.

The first axial end portion 5b comprises, in a proximal position to the substantially cylindrical central portion 5a, a portion 5b1 comprising a plurality of transversal sections having smaller diameters than the diameter D1. In the example illustrated in the figures, such transversal sections define a cylindrical surface 5d.

The first axial end portion 5b further comprises, in a distal position with respect to the substantially cylindrical central portion 5a, a portion 5b2 comprising a plurality of transversal sections having progressively increasing diameters moving away from the substantially cylindrical central portion 5a. In the example illustrated in the figures, such transversal sections define a conical-shaped surface 5e, with a larger base at the left end of the shaft 2. Such a conical surface 5e has a rectilinear generatrix.

The through-cavity 2a of the bottom bracket assembly 1 comprises, on the opposite side to the first axial end portion 5b with respect to the substantially cylindrical central portion 5a, a second axial end portion 5f having a different diameter D3 to the first diameter D1.

The second axial end portion 5f is connected to the substantially cylindrical central portion 5a through a second radiused surface 5g comprising a concave surface 5g1 and a convex surface 5g2.

The second axial end portion 5f comprises, in a proximal position to the substantially cylindrical central portion 5a, a portion 5f1 comprising a plurality of third transversal sections having smaller diameters than the diameter D1. In the example illustrated in the figures, such transversal sections define a cylindrical surface 5h.

The second axial end portion 5f further comprises, in a distal position with respect to the substantially cylindrical central portion 5a, a portion 5f2 comprising a plurality of transversal sections having progressively increasing diameters moving away from the substantially cylindrical central portion 5a. In the example illustrated in the figures, such transversal sections define a conical-shaped surface 5i, with a larger base at the right end of the shaft 2. Such a conical surface has a curvilinear generatrix.

From what has been described above, it can be understood how the surface that defines the aforementioned through-cavity 2a has, at every variation in diameter, a radiused portion without sharp edges or undercut areas, thus lacking areas in which dirt and/or corrosive substances can accumulate. Moreover, the shaft 2 has, at the opposite end portions 3 and 4 thereof, openings of large diameter compatibly with the strength cross section. The dirt and/or corrosive substances that possibly enter into the through-cavity 2a from one end thereof can thus easily come out from the opposite end from where they entered, as well as possibly from the same end from where they entered.

Preferably, the assembly 1 described herein has the following dimensional characteristics:

the substantially cylindrical central portion 5a has a diameter equal to about 25 mm;

the shaft 2, at the substantially cylindrical central portion 5a, has an outer diameter equal to about 30 mm;

the transversal sections of the portion 5b1 have a diameter equal to about 20 mm;

the rectilinear generatrix of the conical surface 5e is inclined with respect to the axis X-X by an angle comprised between about 5° and about 7°, in particular equal to about 6.7°;

the transversal sections of the portion 5b2 comprise an axially outermost transversal section having a diameter greater than about 20 mm, in particular equal to about 20.8 mm;

the concave surface 5c1 of the first radiused surface 5c has a greater bending radius than that of the convex surface 5c2, in particular the bending radius of the concave surface 5c1 is equal to about 7 mm and the bending radius of the convex surface 5c2 is equal to about 5 mm;

the transversal sections of the portion 5f1 have a diameter greater than about 20 mm, in particular equal to about 21 mm;

the transversal sections of the portion 5f2 comprise an axially outermost transversal section having a diameter greater than about 25 mm, in particular equal to about 28 mm;

the concave surface 5g1 of the second radiused surface 5g has a greater bending radius than that of the convex surface 5g2, in particular the bending radius of the concave surface 5g1 is equal to about 7 mm, whereas the bending radius of the convex surface 5g2 is equal to about 5 mm;

the bending radius of the conical surface 5i is equal to about 40 mm.

Preferably, the left crank arm 40 is made of composite material, more preferably carbon fibre. Alternatively, the left crank arm 40 can be made of metal material, more preferably light alloy, for example aluminium alloy.

When the left crank arm 40 is made of composite material, the body of composite material of the left crank arm 40 is coupled (in the example shown in FIG. 1, the body of composite material is screwed) with the radially outer surface 42a of a substantially annular shaped metal insert 42. Such a metal insert 42 is in turn coupled with the first axial end portion 4 of the shaft 2.

Preferably, the right crank arm 30 is made of composite material, more preferably carbon fibre. Alternatively, said right crank arm 30 can be made of metal material, more preferably light alloy, for example aluminium alloy.

When the right crank arm 30 is made of composite material, the body of composite material of the right crank arm 30 is directly coupled with the radially outer surface of the axial end portion 3 of the shaft 2, whereas the coupling of the axial end portion 4 of the shaft 2 with the left crank arm 40 takes place through the metal insert 42 described above.

The shaft 2 is preferably made of metal material, more preferably light alloy, for example aluminium alloy.

The bottom bracket assembly 1 further comprises an adjuster 8 for adjusting the axial position of the left crank arm 40 with respect to the pair of bearings 41 and 31.

In the example illustrated in the figures, adjuster 8 is axially arranged between the left crank arm 40 and the bearing 41 and comprise a first service ring nut 8a in axial abutment with the inner ring 410 of the bearing 41, a second service ring nut 8b coupled with the first service ring nut 8a and in axial abutment with the left crank arm 40 and position lock 8c for locking the axial position of the second service ring nut 8b with respect to the first service ring nut 8a.

The first service ring nut 8a comprises an external threading 8a1 and the second service ring nut 8b comprises an internal threading 8b1 engaged with the external threading 8a1.

The position lock 8c comprise a fixing dowel 8d acting on the first service ring nut 8a and passing through a substantially radial hole 8e formed on the second service ring nut 8b. The fixing dowel 8d is externally threaded and engages on a threading of the substantially radial hole 8e.

A protective shield 9b of the left radial bearing 41 is axially arranged between the aforementioned bearing and the first service ring nut 8a.

From what has been described above it can be understood how in the assembly 1 of the present invention it is possible to carry out a fine adjustment of the axial position of the left crank arm 40 with respect to the housing box 10 provided in the frame of the bicycle, so as to obtain a correct positioning of the left crank arm 40 when housing boxes 10 having axial dimensions different from standard are used.

It should be noted that, for the sake of simplicity of explanation, the bottom bracket assembly and the left crank arm assembly have been described and are claimed in the respective assembled configurations and/or when mounted on a bicycle. Of course, the scope of protection of the present invention nevertheless also extends to a bottom bracket assembly and to a left crank arm assembly in respective disassembled configurations and/or when dismounted from a bicycle, wherein the respective components, when assembled and/or mounted on a bicycle, define the aforementioned assembled and/or mounted configurations.

What is claimed is:

1. A bicycle bottom bracket assembly comprising:
   a shaft having an longitudinal axis (X-X) extending continuously between the shaft's end portions;
   a left crank arm
   a right crank arm;
   a first end portion of the shaft includes at an axially outermost portion thereof an external threading and a grooved outer surface that is located axially inward from said external threading and couples with complementary grooves in said left crank arm; and,
   a through-cavity that extends along said continuous longitudinal axis with a varying inner surface diameter between the shaft's end portions that includes radiused surfaces.

2. Bottom bracket assembly according to claim 1, comprising a first coupler that couples said left crank arm with said shaft and is arranged in a radially outer position with respect to said shaft.

3. Bottom bracket assembly according to claim 1, comprising a second coupler that couples said right crank arm with said shaft and is arranged in a radially outer position with respect to said shaft.

4. Bottom bracket assembly according to claim 1, wherein said through-cavity comprises a substantially cylindrical central portion having a first diameter and a first axial end portion having at least one second diameter different from said first diameter.

5. Bottom bracket assembly according to claim 4, wherein said first axial end portion is connected to said substantially cylindrical central portion through a first radiused surface.

6. Bottom bracket assembly according to claim 4, wherein said first axial end portion comprises, in a proximal position to said substantially cylindrical central portion, at least a plurality of first transversal sections having smaller diameters than said first diameter.

7. Bottom bracket assembly according to claim 4, wherein said first axial end portion comprises, in a distal position with respect to said substantially cylindrical central portion, a plurality of second transversal sections having progressively increasing diameters moving away from said substantially cylindrical central portion.

8. Bottom bracket assembly according to claim 4, wherein said through-cavity comprises, on the opposite side to said first axial end portion with respect to said substantially cylindrical central portion, a second axial end portion having at least a third diameter different from said first diameter.

9. Bottom bracket assembly according to claim 8, wherein said second axial end portion is connected to said substantially cylindrical central portion through a second radiused surface.

10. Bottom bracket assembly according to claim 4, wherein said first axial end portion is defined at said left crank arm.

11. Bottom bracket assembly according to claim 1, wherein said left crank arm comprises a through hole which is at least partially grooved for the sliding coupling with said grooved outer surface.

12. Bottom bracket assembly according to claim 11, wherein said bottom bracket assembly further comprises an internally threaded ring nut screwed onto said external threading and in axial abutment onto said left crank arm.

13. Bottom bracket assembly according to claim 12, wherein said ring nut is housed in a substantially circumferential seat formed in said left crank arm so that said ring nut does not project axially with respect to said left crank arm.

14. Bottom bracket assembly according to claim 12, wherein said ring nut comprises, on an axially outer face thereof, at least one hole for coupling with a mounting tool.

15. Bottom bracket assembly according to claim 1, wherein said second end portion of said shaft comprises a threaded outer surface and said right crank arm comprises a threaded hole for screwing onto said threaded outer surface.

16. A bicycle bottom bracket assembly comprising:
   a shaft having an longitudinal axis (X-X) extending between the shaft's end portions;
   a left crank arm associated with a first end portion of said shaft;
   a right crank arm associated with a second end portion of said shaft;
   a through-cavity that extends unobstructed along said longitudinal axis through the crank arms and said shaft;

a pair of bearings that support said shaft in rotation with respect to a housing box of the bottom bracket assembly provided in a bicycle frame;

an adjuster for adjusting an axial position of at least one of said left crank arm and said right crank arm with respect to said pair of bearings, wherein said adjuster is axially arranged between said at least one of said left crank arm and said right crank arm and a respective bearing of said pair of bearings;

a first service ring nut in axial abutment with said respective bearing of said pair of bearings;

a second service ring nut coupled with said first service ring nut and in axial abutment with said at least one of said left crank arm and said right crank arm; and a position lock for fixing the axial position of said second service ring nut with respect to said first service ring nut.

17. Bottom bracket assembly according to claim 16, wherein said first service ring nut comprises an external threading, said second service ring nut comprises an internal threading engaged with said external threading and said position lock comprise a fixing dowel acting on said first service ring nut and passing through a substantially radial hole formed on said second service ring nut.

18. Bottom bracket assembly of a bicycle, comprising:
a shaft having an axis (X-X) extending along a longitudinal direction between the shaft's end portions;
a pair of crank arms, each one associated with a respective end portion of said shaft;
a first end portion of the shaft includes at an axially outermost portion thereof an external threading and a grooved outer surface that is located axially inward from the external threading and couples with complementary grooves in at least one crank arm of said pair of crank arms;

a pair of bearings that support said shaft in rotation with respect to a housing box of the bottom bracket assembly provided in a bicycle frame;

an adjuster for adjusting an axial position of said at least one crank arm of said pair of crank arms with respect to said pair of bearings, wherein said adjuster is axially arranged between said at least one crank arm of said pair of crank arms and a respective bearing of said pair of bearings, wherein said adjuster comprises:
a first service ring nut in axial abutment with said respective bearing;
a second service ring nut coupled with said first service ring nut and in axial abutment with said at least one crank arm of said pair of crank arms; and
a position lock for fixing an axial position of said second service ring nut with respect to said first service ring nut.

19. Bottom bracket assembly according to claim 18, wherein said first service ring nut comprises an external threading, said second service ring nut comprises an internal threading engaged with said external threading and said position lock comprises a fixing dowel acting on said first service ring nut and passing through a substantially radial hole formed on said second service ring nut.

\* \* \* \* \*